(12) United States Patent
Chenevert et al.

(10) Patent No.: US 7,677,022 B2
(45) Date of Patent: Mar. 16, 2010

(54) CONVERTIBLE MOWER DECK WITH ANGLED PIVOTING BAFFLES

(75) Inventors: Jeffrey Paul Chenevert, Apex, NC (US); Michael Todd Schmidt, Holly Springs, NC (US)

(73) Assignee: Deere & Company, Moline, IL (US)

( * ) Notice: Subject to any disclaimer, the term of this patent is extended or adjusted under 35 U.S.C. 154(b) by 331 days.

(21) Appl. No.: 11/253,991

(22) Filed: Oct. 19, 2005

(65) Prior Publication Data

US 2007/0084176 A1 Apr. 19, 2007

(51) Int. Cl.
*A01D 67/00* (2006.01)
(52) U.S. Cl. ..................... 56/320.2; 56/320.1
(58) Field of Classification Search .............. 56/1, 56/6, 320.1, 320.2
See application file for complete search history.

(56) References Cited

U.S. PATENT DOCUMENTS

| | | | | |
|---|---|---|---|---|
| 4,226,074 A * | 10/1980 | Mullet et al. | ............... | 56/320.2 |
| 5,195,311 A * | 3/1993 | Holland | ..................... | 56/320.2 |
| 5,465,564 A | 11/1995 | Koehn et al. | | |
| 5,845,475 A * | 12/1998 | Busboom et al. | ........... | 56/320.1 |
| 6,609,358 B1 | 8/2003 | Schmidt et al. | ............ | 56/320.2 |
| 6,735,932 B2 | 5/2004 | Osborne | ..................... | 56/320.1 |
| 6,751,937 B2 | 6/2004 | Kobayashi et al. | ............ | 56/202 |
| 6,910,324 B2 | 6/2005 | Kakuk | ......................... | 56/255 |
| 7,051,504 B2 * | 5/2006 | Osborne | .................... | 56/320.2 |
| 2003/0145572 A1 | 8/2003 | Kakuk | | |
| 2004/0255567 A1 | 12/2004 | Kallevig et al. | | |
| 2005/0126152 A1 | 6/2005 | Boeck et al. | | |

FOREIGN PATENT DOCUMENTS

EP 1 609 348 12/2005

* cited by examiner

Primary Examiner—Alicia M Torres

(57) ABSTRACT

A convertible mower deck has a plurality of adjoining cutting chambers under a mower deck, each cutting chamber having a cutting blade mounted to the lower end of a vertical spindle. Angled pivoting baffles are positioned in the openings between adjoining cutting chambers, and a baffle also is mounted in the discharge opening from one of the cutting chambers. The baffles may pivot between an open position for the grass clippings to be discharged or collected, a closed position for the grass clippings to be mulched, and one or more intermediate positions for some of the clippings to be discharged or collected, and the remainder to be mulched.

11 Claims, 3 Drawing Sheets

CONVERTIBLE MOWER DECK WITH ANGLED PIVOTING BAFFLES

FIELD OF THE INVENTION

This invention relates to mower decks and, more specifically, to mower decks that are convertible between a discharge or collection position and a mulching position.

BACKGROUND OF THE INVENTION

Mower decks have been designed that are convertible between a discharge or collection position and a mulching position. For example, U.S. Pat. No. 6,609,358 entitled "Mower Having a Mower Deck Adapted for Selective Mulching or Non-Mulching Modes" relates to a mower deck that can be converted between a discharge or collection position and a mulching position. The conversion may be done without using tools, and without separately attaching or detaching components on the deck. The convertible mower deck enables an operator to avoid the inconvenience of having to stop mowing to either remove or install a mulch kit. The convertible mower deck has adjustable baffles between adjacent cutting chambers that can be moved to an open position in which grass clippings move between the cutting chambers and out through a discharge opening, or to a closed position in which grass clippings are mulched by restricting their movement between cutting chambers and blocking the discharge opening. The pivoting baffles may be moved to either the open position or the closed position with a handle attached to the top surface of the deck.

In the mower deck shown in U.S. Pat. No. 6,609,358, each pivoting baffle between adjacent cutting chambers includes a pair of plates that pivot on generally vertical axes, and a single plate over the discharge opening that pivots on a horizontal axis. The pivoting baffles may be linked together with a slot/follower linkage so that they open and close in proper synchronization. A convertible mower deck is needed having a simplified linkage between the pivoting baffles; i.e., a linkage having fewer parts and reduced cost.

The mower deck of U.S. Pat. No. 6,609,358 has a fixed baffle that extends from the pivot point of the right outer pivoting baffle to the discharge opening. To provide good performance in the mulching mode, the fixed baffle may be positioned near the mower blade under the right side of the mower. As a result, the discharge opening of the mower deck may be significantly smaller than the discharge opening of a conventional mower deck having a similar overall width. A convertible mower deck is needed that has a large discharge opening to maximize the quantity of clippings that may be discharged or collected, and to reduce the risk of build-up of grass clippings in or near the discharge opening.

SUMMARY OF THE INVENTION

A convertible mower deck has angled pivoting baffles between adjacent cutting chambers. The convertible mower deck includes a rotary cutting blade in each chamber and a discharge opening at the side of one of the cutting chambers. The angled pivoting baffles may pivot between an open position allowing flow of grass clippings between the cutting chambers, and a closed position blocking flow of grass clippings between the cutting chambers. The angled pivoting baffles may be generally "L"-shaped.

DESCRIPTION OF THE PREFERRED EMBODIMENT

Figure 1:
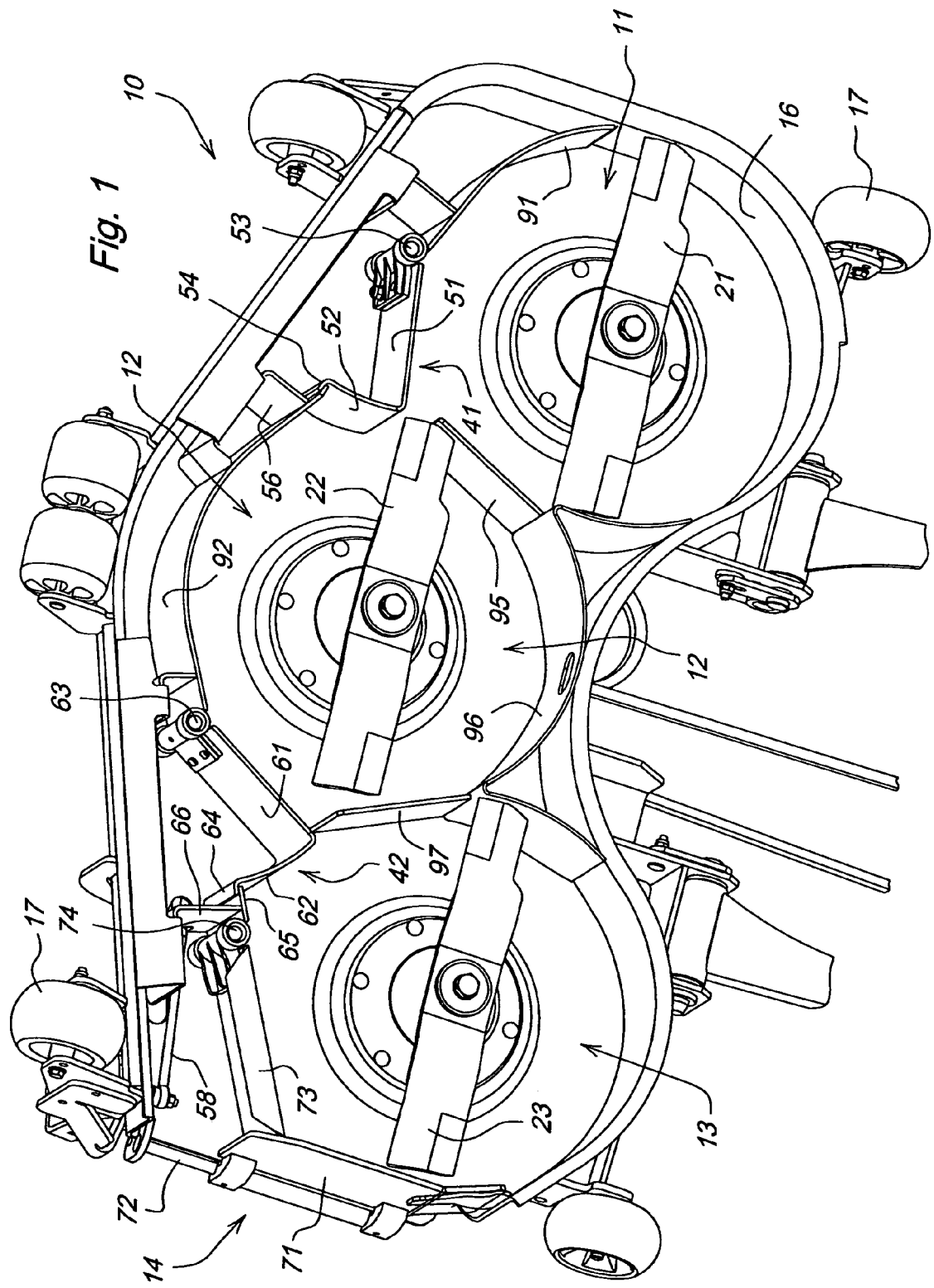
FIG. 1 is a bottom perspective view of a convertible mower deck according to one embodiment of the invention, with the mower deck in a mulching position.
Figure 2:
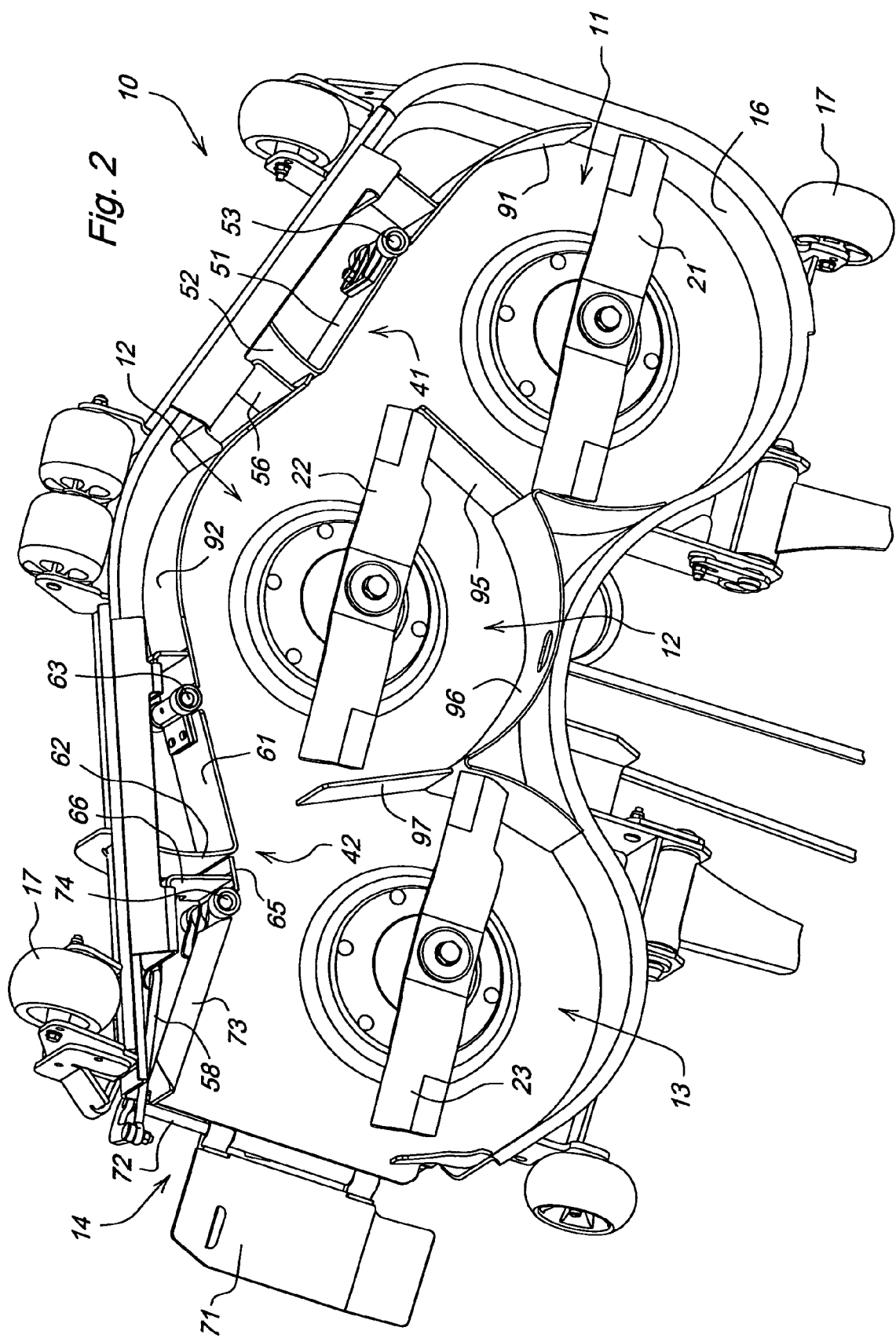
FIG. 2 is a bottom perspective view of a convertible mower deck according to one embodiment of the invention in a collection or discharge position.

In one embodiment of the invention, as shown in FIGS. 1 and 2, convertible mower deck 10 may include and/or cover three adjacent cutting chambers 11, 12, 13, with each cutting chamber covering or housing a rotary cutting blade 21, 22, 23. The cutting blades may be mounted and secured to the lower ends of generally vertically oriented spindles for rotation on vertical axes. The spindles may be turned by one or more belts wound around pulleys attached to the upper ends of the spindles.

In one embodiment, mower deck 10 may have a skirt 16 extending downwardly around at least a portion of the outer periphery from the top surface of the mower deck. Wheels 17 may be attached to the skirt and/or periphery of the mower deck to help prevent or minimize damage or scalping of the ground surface or turf when mowing.

In one embodiment, angled pivoting baffles 41, 42 may be positioned under the mower deck. Each angled pivoting baffle 41, 42 may pivot to control the size of the passage or opening between adjacent cutting chambers. For example, baffles 41, 42 may pivot between a fully open position for discharge or collection of clippings, a fully closed position for mulching, and one or more intermediate positions in which some of the grass clippings may be discharged or collected, and the remainder may be mulched. Baffle 41 is between adjacent cutting chambers 11 and 12, and baffle 42 is between adjacent cutting chambers 12 and 13.

In one embodiment, if baffles 41, 42 are in a fully open position, grass may be cut and swept along a flow pathway that extends and interconnects the three cutting chambers, and which continues through discharge opening 14. If baffles 41, 42 are placed in a fully closed position, grass clippings may be recirculated and recut within each cutting chamber. If the baffles are placed in an intermediate position, a portion of the grass clippings may be swept along the flow pathway between the cutting chambers and out the discharge opening or collected, and the rest of the clippings may be recirculated and recut within each cutting chamber.

In one embodiment, baffle 41 may be a generally "L"-shaped plate having a first portion 51 and a second portion 52. The end of the first portion may be connected to vertical hinge or pivot shaft 53 near the front rim of the mower deck. Baffle 42 also may be a generally "L"-shaped plate having a first portion 61 and a second portion 62, the end of the first portion connected to vertical hinge or pivot shaft 63 near the front rim of the mower deck.

In one embodiment, each angled pivoting baffle 41, 42 may be a plate that is generally "L"-shaped. In other words, the second portion of the plate may be generally or approximately perpendicular to the first portion of the plate. However, the second portion of the plate be at any angle of between about 60 degrees and about 120 degrees from the first portion of the plate.

In one embodiment, each angled pivoting baffle may have a small flange 54, 64 bent or formed on the end of the second portion of the plate; i.e., opposite the pivot axis. Each of flanges 54, 64 may engage a similar mating flange 55, 65 on stationary baffles 56, 66 under the deck when operating in the mulching position. Engagement of the flanges may provide support to the pivoting baffles while operating the convertible mower deck in the mulching position, to reduce damage to the baffles due to impacts. The mating flanges may be arranged in a manner such that they are protected from grass and debris under the mower deck and to prevent build-up of material on the mating surfaces.

In one embodiment, when baffles 41, 42 are pivoted outwardly (away from the mower blade spindles) into the discharge or collection position, they allow grass clippings and debris to flow across the mower deck from the trim side to the discharge side of the mower deck. If the baffles are pivoted toward the mulching position, they rotate inwardly toward the mower blade spindles and together with the stationary baffles, isolate each mower blade in a separate cutting chamber. Additionally, the angled pivoting baffles may be positioned at any intermediate position between the discharge or collection position and the mulching position. This allows the amount of grass clippings that are mulched to be increased or decreased relative to the amount discharged or collected.

In one embodiment, the discharge opening 14 of the mower deck may be at least partially covered by a baffle that may be opened or closed together with the baffles between the cutting chambers. For example, the area of discharge opening 14 may be increased or decreased in area depending upon the operational mode of the mower deck.

In one embodiment, the discharge baffle may consist of a pair of pivoting plates that at least partially cover the discharge opening. More specifically, plate 71 pivots on a generally horizontal axis 72, and plate 73 pivots on a generally vertical axis. Plate 73 may pivot on vertical axis 74 toward a mulching position closer to cutting blade 23, or toward a side discharge or collection position further away from cutting blade 23.

In one embodiment, the underside of the mower deck may include fixed or stationary baffles 65, 91-92 and 95-97 to define, surround and separate each of cutting chambers 11-13. For example, fixed front baffles 91, 92 may be attached to and extend from skirt 16, and together with the skirt may form a substantially continuous wall or wall member to partially define the three adjacent cutting chambers. Additionally, fixed rear baffles 95-97 may be positioned adjacent the rear of the mower deck. Fixed rear baffles 95 and 97 may provide dividers between the adjacent cutting chambers.

In one embodiment, the baffles may provide a circumferential lower periphery which falls below the cutting plane of each blade. In the mulching position, the baffles substantially enclose each cutting blade within its cutting chamber and provide the necessary recirculation for mulching.

In one embodiment, the convertible mower deck of the present invention may include fewer parts, reduced linkage complexity, and simplified assembly. For example, each angled pivoting baffle may be a unitary, one-piece structure. Additionally, the angled pivoting baffles allow the number of linkages between the baffles to be reduced.

Figure 3:
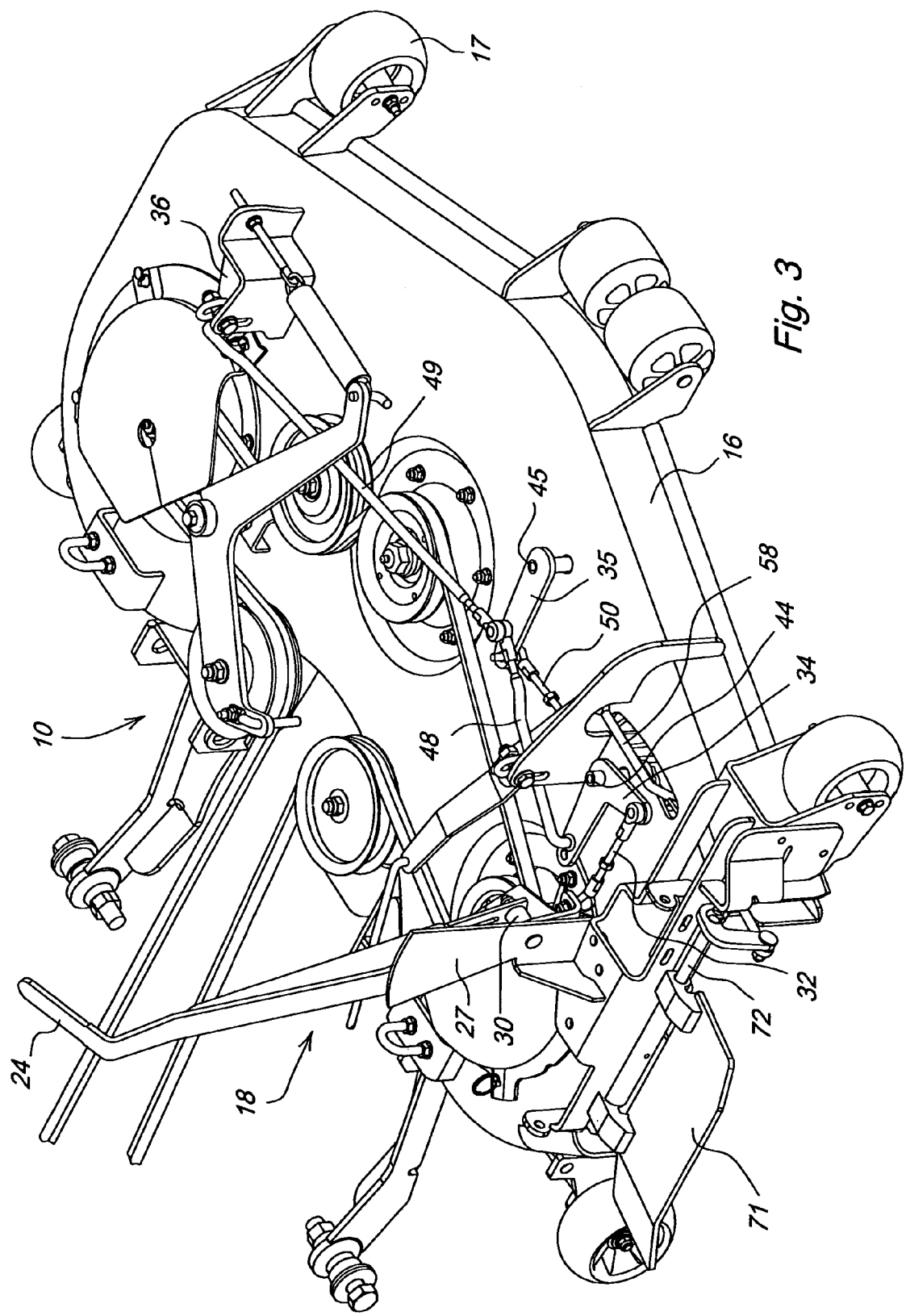
FIG. 3 is a top perspective view, partially in section, of a convertible mower deck according to one embodiment of the invention.

Now referring to FIG. 3, in one embodiment, control structure 18 may be mounted on or over the top plate or surface of mower deck 10. The control structure may be used to selectively operate or shift the angled pivoting baffles 41, 42 as well as the baffle over the discharge opening. The baffles may pivot between a discharge or collection position, a mulching position, and to one or more intermediate positions in which some of the grass clippings may be discharged or collected, and some of the grass clippings may be mulched simultaneously. The control structure may be linked to and control all of the pivoting baffles under the mower deck, and may move the baffles between open and closed positions, and also may move the baffles to intermediate positions in which they are partially open. In each position, the handle may be releasably secured or locked in the desired position.

In one embodiment, control structure 18 may include a generally vertically oriented pivoting handle 24 having a lower end linked to cranks 34-36. Each of the cranks 34-36 may be pivotably mounted on or over the top surface or plate of mower deck 10. Each of cranks 34-36 may be attached to generally vertically aligned pivot shafts, and may be interconnected by rods or linkages 48-50. Additionally, linkage 58 may connect between the two baffles in the discharge opening. Crank 34 also may be connected by rod 32 to handle 24 which is part of the control structure used to move cranks 34-36 and their associated baffles between a discharge/collection position, a mulching position, and one or more intermediate positions in which the baffles are partially open.

In one embodiment, handle 24 may be reached from the operator's seat of the vehicle, and may pivot on a generally horizontal pivoting axis 30. The ability of an operator to reach and move handle 24 from a seated position allows the operator to easily shift between the discharge/collection position, mulching position, and one or more intermediate positions, while mowing. Handle 24 may be mounted to deck 10 through pivot axis 30 extending through upright support 27.

Baffles 41, 42 between the cutting chambers may be held in one or more intermediate positions between the fully open and fully closed positions. The volume of grass clippings transferred from one cutting chamber to the next may be controlled by the baffles between each chamber. The amount of grass clippings discharged or bagged also may be controlled by the baffle consisting of a pair of plates 71, 73 at least partially covering the discharge opening of the deck.

The embodiment shown in FIGS. 1-3 provides control of all pivoting baffles with a single control structure, but in an alternative embodiment, the baffles between the cutting chambers, and at the discharge opening, may be controlled independently.

Having described the preferred embodiment, it will become apparent that various modifications can be made without departing from the scope of the invention as defined in the accompanying claims.

The invention claimed is:

1. A convertible mower deck comprising:

first, second and third generally cylindrical cutting chambers with a first flow passage between the first and second chambers, a second flow passage between the second and third chambers, and a discharge opening from the third chamber;

a first unitary, one-piece angled baffle pivotable to block the first flow passage by closing off separate openings in the periphery of each of the first and the second cutting chambers;

a second unitary, one-piece angled baffle pivotable to block the second flow passage by closing off separate openings in the periphery of each of the second and the third cutting chambers;

a third baffle pivotable to block the discharge opening;

the first baffle isolating a first mower blade for mulching in the first chamber, the first and second baffles isolating a second mower blade for mulching in the second chamber, and the second and third baffles isolating the third mower blade for mulching in the third chamber;

a linkage between the first, second and third baffles; and a control lever to move the baffles to block all of the first and second flow passages and the discharge opening, or to block part of the first and second flow passages and discharge opening.

2. The convertible mower deck of claim 1 further comprising an upright support on the convertible mower deck with a horizontal pivot axis to which the control lever is pivotably attached.

3. The convertible mower deck of claim 1 wherein the third baffle comprises a first plate pivotable on a horizontal axis and a second plate pivotable on a vertical axis between a closed position closer to the third mower blade and an open position further away from the third mower blade.

4. The convertible mower deck of claim 1 wherein the first and second baffles are pivotable on generally vertical axes.

5. The convertible mower deck of claim 1 wherein the first and second baffles each include a flange at one end thereof.

6. An apparatus comprising:

a plurality of adjoining cutting chambers under a mower deck, each cutting chamber having a generally cylindrical wall around a cutting blade mounted to the lower end of a vertical spindle;

openings in the walls of adjoining cutting chambers;

a discharge opening from one of the cutting chambers;

a plurality of angled pivoting baffles mounted under the deck, each angled pivoting baffle being a one-piece, unitary structure having a first portion connected to a vertical hinge and extending rearwardly to controllably close off the opening in the wall of one of the plurality of cutting chambers; and a second portion extending forwardly to controllably close off the opening in the wall of the adjoining cutting chamber;

wherein the second portion is at an angle of between about 60 degrees and about 120 degrees with respect to the first portion.

7. The apparatus of claim 6 further comprising a control structure above the mower deck to move the baffles between a discharge or collection position and the mulching position.

8. The apparatus of claim 7 wherein the control structure is a pivoting handle.

9. The apparatus of claim 6 wherein the angled pivoting baffles mounted under the deck at the openings between adjoining cutting chambers are generally "L"-shaped.

10. The apparatus of claim 6 further comprising flanges at the ends of the second portions of the angled pivoting baffles.

11. The apparatus of claim 6 wherein the baffle at the discharge opening includes a first plate pivoting on a horizontal axis and a second plate pivoting on a vertical axis between a closed position closer to the cutting blade and an open position further away from the cutting blade.

* * * * *